WILLIAMSON & SWIGERT.
Corn Sheller.
No. 32,909. Patented July 23, 1861.
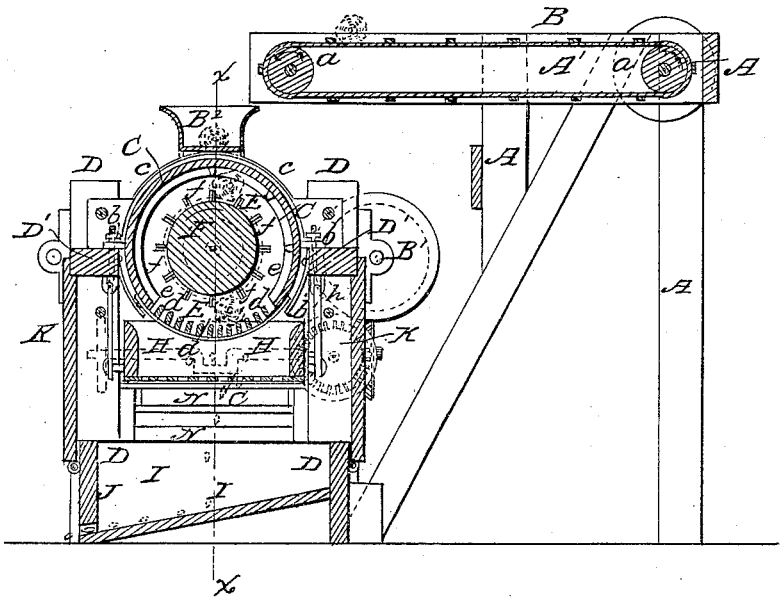
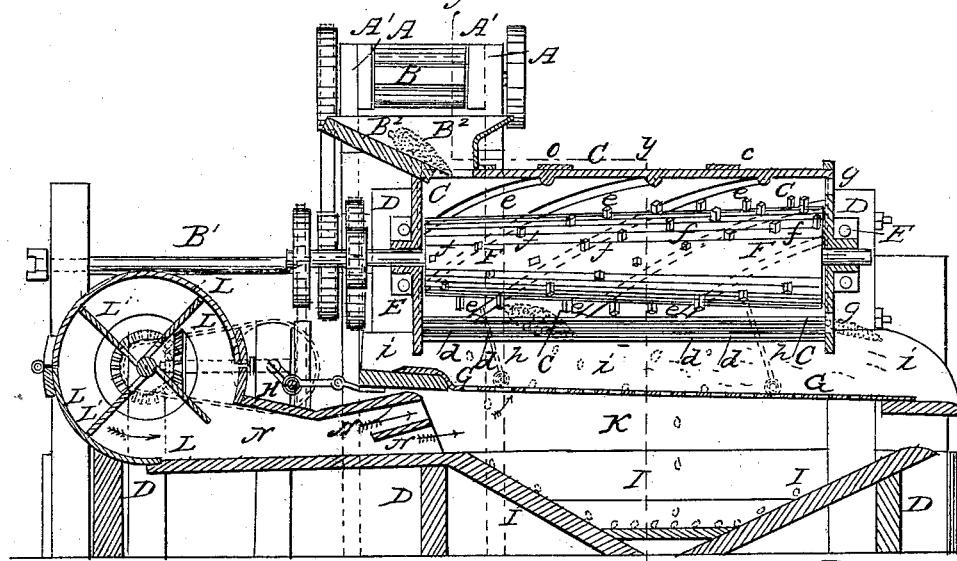

UNITED STATES PATENT OFFICE.

M. F. WILLIAMSON AND J. J. SWIGERT, OF HYATTSVILLE, OHIO.

CORN SHELLER AND CLEANER.

Specification of Letters Patent No. 32,909, dated July 23, 1861.

*To all whom it may concern:*

Be it known that we, M. F. WILLIAMSON and J. J. SWIGERT, of Hyattsville, in the county of Miami and State of Ohio, have invented a new and Improved Corn Sheller and Cleaner; and we do hereby declare that the following is a full, clear, and exact description thereof, reference being had to the accompanying drawings, making part of this specification, in which—

Figure 1 is a longitudinal section through the shelling and cleaning apparatus, taken in the vertical plane indicated by the red line $x$, $x$, in Fig. 2. Fig. 2 is a transverse section through the same, taken in the vertical plane indicated by red line $y$, $y$, in Fig. 1.

Similar letters of reference indicate corresponding parts in both figures.

This invention relates to improvements in machines for shelling corn from the cobs and afterward cleaning the shelled corn by blowing off the bran, etc.

To enable those skilled in the art to make and use our invention we will proceed to describe its construction and operation.

A is a strong framework which supports a trough $A^1$, carrying a continuous, slotted apron B, in its bottom. The apron B, is stretched over the drums $a$, $a$, which receive rotary motion in the direction indicated by the arrows in Fig. 2, from the main driving shaft $B^1$, of the machine through the medium of suitable belts and pulleys. This carrier B, may be made very long so that it will carry the corn in the cob from one apartment and deliver it into the shelling apparatus of the machine which may be in another apartment of the barn. This carrying apron will deliver the corn in the cob to the shelling apparatus much more regularly than could be done by hand, throwing the corn directly into the hopper. The carrier B, conveys the corn in the cob to the hopper $B^2$, and discharges it into the concave.

The shelling apparatus together with the cleaning apparatus are mounted in a frame D, which is at right angles to the frame A. The concave is formed of two portions C, C, which, when united make about three-fourths of a cylinder as shown in Fig. 2, leaving a space or one-fourth open at the bottom. A flange $b$, is cast or otherwise secured to each portion C, C, of the concave which extends from end to end thereof. These flanges $b$, $b$, are used to bolt the concave portions C, C, together to the longitudinal bars $D^1$, $D^1$, of frame D, which bars are supported and firmly braced between four upright posts of frame D. When the portions C, C, are thus bolted to the horizontal bars $D^1$, $D^1$, their upper edges will meet and form a joint on top of the concave. The whole is strengthened by the straps $c$, $c$, which pass over the top of the concave and are bolted down to the bars $D^1$, $D^1$, as shown in Fig. 1 of the drawings. The circular heads E, E, of the concave are secured in a suitable manner to the ends thereof and bolted to the upright posts D.

The space between the edges of the portions C, C, in the bottom of the concave is filled up with longitudinal bars $d$, $d$, $d$, which in cross section are of an oval shape. These bars $d$, $d$, $d$, are arranged as shown in Figs. 1 and 2 of the drawings in an arc concentric with the axis of the concave and between each bar $d$, a space is left sufficiently large to allow grains of corn to pass readily through it. The bars $d$, $d$, are arranged edgewise as shown in Fig. 2, so that their inner edges will form shelling surfaces; and the ends of these bars are secured to the heads E, E. These bars should be made strong and stiff, and this is partly obtained by their oval form (in cross section) and partly by an intermediate support between the heads E, E. The inside surface of concave C, C, has a number of spiral ribs $e$, $e$, $e$, formed on it, which, besides serving as shellers, serve also to conduct the cobs toward the rear end of the concave, and finally discharge them therefrom.

Within the concave is a rotary sheller F, which is slightly tapering from the rear to the front end so that the space where the corn in the ear is first received is larger than the space at the opposite end of the concave. The shaft of cone F, has its bearings in the heads E, E, as shown in Fig. 1, and the conical sheller F, is rotated in the direction indicated by the arrow in Fig. 2, of the drawings. The surface of conical sheller F, has a number of square projections $f$, $f$, $f$, arranged on it in a spiral form, the spiral rows running from one end to the other of this cone as shown in Fig. 1. These projections $f$, $f$, $f$, and the spiral ribs $e$, $e$, $e$, together with the longitudinal bars $d$, $d$, $d$, form the shelling surfaces, and as rapidly as the corn is shelled it passes through the bottom of the concave between the bars $d$, $d$, $d$, while the cobs are impelled toward the rear end of the concave and forced through discharging holes $g, g$, (Fig. 1) by the action of the spiral shelling projections upon the cobs. The object of gradually diminishing the space between the concave and cone, from the receiving to the discharging end thereof is that large and small cobs may be completely divested of every grain before they are discharged from the machine.

Below the bars $d, d, d$, and hung by arms $h, h, h$, is an inclined riddle G, the perforations through which are large enough to allow the grains of corn falling on it from the hopper, to pass freely through. This riddle is constructed with side boards $i, i$, and it inclines toward the rear end of the machine. The riddle G, extends beyond the front and the rear ends of the shelling apparatus and it is hung as near to the rods $d, d, d$, as possible, but as this riddle G, must have a vibrating motion it is arranged a suitable distance below the bars $d, d$, to admit of this motion, and two longitudinal curved guards $j, j$, (shown in Fig. 2) are used to prevent the grains of corn from escaping from the sides of the riddle.

Riddle G, is shaken by a crank on shaft H, to which the riddle is connected by rod $H^1$. Below the riddle G, three inclined boards I, I, I, are brought together as shown in Figs. 1 and 2, which receive and discharge all the corn falling from the riddle through the opening J,—see Fig. 1. Both sides of the frame D, are closed by hinged shutters K, K, when the machine is in operation.

L is a fan box, and $L^1$, the fans which are rotated in the direction indicated by the arrow in Fig. 1, by bevel gearing or belts communicating with the main driving shaft B, (Fig. 1). The currents of air from the fan box L, are conducted through the passages N, N, and made to impinge upon the bottom of the riddle G. The blast is driven up through the riddle G, and below this riddle, toward the rear end of the machine, and the grains of corn are exposed to this blast of air, from the time they pass through the bars $d, d, d$, until they are finally discharged from opening J. The light particles of bran, etc. are thus blown out from the rear end of the machine and the corn is in this manner cleaned before it is discharged from the machine.

We will now describe the operation of the entire machine. Motion is communicated to the main shaft $B^1$, and transmitted from this shaft to the drums $a, a$, sheller F, crank shaft H, and fans L, L, through suitable belts and pulleys, and when the machine is thus set in motion, ears of corn are put on the endless apron B, which conveys them to the hopper $B^2$, and discharges them into one end of the shelling apparatus, there the ears of corn are received between the rotating sheller F, and the concave portions C, C, and shelling bars $d, d, d$, which parts shell the corn from the ears at the same time move the ears toward the rear end of the machine. As fast as the corn is shelled it escapes from the shelling apparatus between bars $d, d, d$, and falls on the riddle G, which is kept in constant agitation, as before described, where the corn is subjected to a strong blast of air from the fan box L. The grains of corn pass rapidly through this riddle leaving a great portion of the bran, etc. behind, which is blown out from the rear end of the machine; and as the grains fall from the riddle on the inclined boards I, I, they are again subjected to the blast of air from the fan box L, which blows off the finer particles of bran that have escaped through the riddle. The corn is finally discharged through opening J, where it is concentrated by the inclined boards I, I, I, before described.

We claim—

The arrangement of the endless feeding apron B. hopper $B^2$. spirally ribbed concave C. shelling bars $d$. and spirally spiked shelling cylinder F. with the moving riddle G. fan L. and boards or box I. as herein shown and described, the parts being constructed and operating together in the manner set forth.

M. F. WILLIAMSON.
J. J. SWIGERT.

Witnesses:
JACOB FERRIS,
L. M. HAGEMAN.